No. 781,881.

Patented February 7, 1905.

UNITED STATES PATENT OFFICE.

JOSEPH ROSS HUNTER, OF PHILADELPHIA, PENNSYLVANIA, ASSIGNOR TO WILLIAM HINCKLE SMITH, OF PHILADELPHIA, PENNSYLVANIA.

FILLER FOR RUBBER.

SPECIFICATION forming part of Letters Patent No. 781,881, dated February 7, 1905.

Application filed July 16, 1904. Serial No. 216,873.

*To all whom it may concern:*

Be it known that I, JOSEPH ROSS HUNTER, a citizen of the United States, residing in the city and county of Philadelphia, State of Pennsylvania, have invented a new and useful Improvement in Fillers for Rubber, of which the following is a specification.

The object of my invention is to provide a filler for rubber which shall reduce the weight of the product greatly.

Another object of my invention is to supply a filler for rubber which shall act as a binder to unite the parts of the resultant composition with great firmness.

A further object of my invention is to provide a filler for rubber which is non-inflammable, a non-conductor of heat and electricity, impervious to moisture, and little affected by the ordinary acids and fluids, said filler imparting or maintaining these characteristics to or in the resultant rubber composition.

In carrying out my invention I combine with the rubber finely-divided bone from which fluid, fatty and mineral matters, such as lime, have been removed, usually called "ossein," the residuum being preferably in the form of fibers. The proportions of bone and rubber or bone and shoddy (reclaimed rubber) or bone and shoddy and rubber required vary greatly with the purpose for which the composition is to be used; but my filler has been found to require less of rubber or shoddy or of both than clays, earths, and other present known fillers by reason both of the natural cohesion of the particles of my filler and the bonding effect of the fibers preferably used. For this reason it has been possible in many cases where my filler is used to dispense with the interspersed layers of cloth or other reinforcing material used in the manufacture of many articles while using less than the usual proportion of rubber and to obtain a lighter and more homogeneous product having unusual qualities and powers of resistance to the elements, acids, wear, &c.

My filler is itself quite light, non-inflammable, a non-conductor of heat and of electricity, impervious to moisture, and but little affected by the ordinary acids and fluids. The combination resulting from its use as a filler for rubber partakes of these qualities and fits the rubber so formed for special uses for which rubber having other fillers is unsuitable.

Having thus described my invention, what I claim as new, and desire to secure by Letters Patent, is—

1. A filler for rubber consisting of shreds from bone.
2. A filler for rubber consisting of fibers of delimed bone.
3. A filler for rubber consisting of fibers of bone from which fluid matters have been removed.
4. A filler for rubber consisting of shreds of bone from which mineral matter has been removed.
5. A filler for rubber consisting of finely-divided bone from which mineral matter has been removed.
6. A filler for rubber consisting of ossein.
7. A filler for rubber consisting of bone from which fluid fatty and mineral matters have been removed.
8. A filler for rubber consisting of delimed animal tissue.
9. A filler for rubber consisting of finely-divided delimed fibrous material.

JOSEPH ROSS HUNTER.

Witnesses:
WM. CANER WIEDERSEIM,
W. S. JACKSON.